United States Patent [19]

Henry et al.

[11] Patent Number: 4,680,959
[45] Date of Patent: Jul. 21, 1987

[54] EMULATION SYSTEM FOR A MOTOR VEHICLE DRIVETRAIN

[75] Inventors: Kenneth J. Henry, Southfield; Allan J. Kotwicki, Sterling Heights, both of Mich.

[73] Assignee: General Motors Corporation, Detroit, Mich.

[21] Appl. No.: 854,942

[22] Filed: Apr. 23, 1986

[51] Int. Cl.⁴ ............................................ G01M 15/00
[52] U.S. Cl. .................................... 73/117; 73/865.6
[58] Field of Search ................ 73/117, 146, 123, 126, 73/862.08, 865.6

[56] References Cited

U.S. PATENT DOCUMENTS 3,926,043 12/1975 Marshall et al. ...................... 73/117
4,161,116 7/1979 Fegraus et al. ....................... 73/117
4,327,578 5/1982 D'Angelo ............................. 73/117

OTHER PUBLICATIONS

Kotwicki, A. J., Dynamic Models for Converter Equipped Vehicles, SAE Paper 820393.
Reynolds, M.G., et al., Computer-Controlled Electric Drive Train Test Facility, SAE Paper 820262.

Primary Examiner—Jerry W. Myracle
Attorney, Agent, or Firm—Mark A. Navarre

[57] ABSTRACT

An on-line system for emulating the operation of a motor vehicle drivetrain including a torque converter, a converter clutch and a shiftable ratio automatic transmission. Nonlinear differential equations describing the ability of the drivetrain input torque to accelerate the engine inertia and the ability of the drivetrain output torque to overcome the road load and accelerate the vehicle inertia are coupled by a drivetrain model, and periodically integrated forward in real time to provide desired (predicted) engine and vehicle speed values. The predicted engine speed forms the basis for a speed control signal which is applied to an engine dynamometer to load an engine under test as though it were actually installed in a motor vehicle including the modeled drivetrain elements.

3 Claims, 12 Drawing Figures

EMULATION SYSTEM FOR A MOTOR VEHICLE DRIVETRAIN

This invention relates to a motor vehicle drivetrain emulation system for use in connection with a motor vehicle engine and dynamometer for facilitating laboratory measurement of various vehicle performance criteria.

BACKGROUND OF THE INVENTION

Electric dynamometers are often used to facilitate motor vehicle testing and to enable laboratory measurement of various performance criteria such as fuel economy and engine exhaust emissions. In some applications, the dynamometer —an engine dynamometer —directly engages the output shaft of an engine; in others, the dynamometer —a chassis dynamometer —engages the tires of an entire vehicle. In either case, the dynamometer is controlled to develop torque which opposes the torque developed by the vehicle engine, and the engine behaves as though it were propelling a vehicle down the road. Fuel consumption and exhaust emission measurements obtained under such conditions closely correspond to those which would be obtained under actual driving conditions.

In one method of dynamometer control, off-line control, the engine speed and torque over time required to drive the vehicle along a predetermined course such as the Federal Urban Driving Schedule are calculated or otherwise determined, and then imposed on the engine and dynamometer in the laboratory test cell. The predetermined torque vs. time characteristic is imposed on the engine with a closed loop engine throttle controller, and the predetermined speed vs. time characteristic is imposed on the engine with a closed loop dynamometer speed controller. This method is not entirely satisfactory because it assumes, simplistically, a causal and predetermined relationship between throttle position and engine speed.

In another method of dynamometer control, on-line control, the engine output torque is measured and used in conjunction with a model of the vehicle inertias to compute the engine speed which would occur were the engine propelling a vehicle down the road. The computed speed is imposed on the engine on a real time basis with a closed loop dynamometer speed control. To permit economy or emissions measurement for a predetermined driving schedule, the engine throttle is controlled to achieve the scheduled vehicle speed. This method assures causality between throttle position and engine speed, and is therefore considered superior to the off-line method.

Prior work with the on-line method of control has been concerned primarily with chassis or roll dynamometers, where the dynamometer engages the tires of the vehicle and is controlled to emulate the vehicle inertia and road load. Heretofore, the on-line method of control has not been used in connection with an engine dynamometer to emulate the entire vehicle drivetrain in addition to vehicle inertia and road load.

Accordingly, it is an object of this invention to provide an improved on-line emulation system for controlling the operation of an engine dynamometer as a function of measured engine torque, wherein the emulation includes the operation of conventional drivetrain elements including a fluid torque converter and clutch, and an automatic shift multiple speed ratio transmission. Since no transmission is installed between the engine and the dynamometer, the dynamometer need only contend with engine output torque as opposed to the significantly higher transmission output torque.

Nonlinear differential equations relating the ability of the drivetrain input to accelerate the engine inertia and the ability of the drivetrain output to overcome the road load and accelerate the vehicle inertia are defined and updated in relation to measured engine output torque. Drivetrain elements including a fluidic torque converter and shiftable ratio transmission are modeled and used to couple the engine and vehicle differential equations. The drivetrain input torque is determined as a function of the measured engine output torque and the load that would be imposed on the engine by the torque converter and the drivetrain output torque is determined as a function of the transmission output torque and the road load of the vehicle. The coupled differential equations are periodically integrated forward in time assuming substantially constant engine output torque during the integration period using a fourth-order RUNGE-KUTTA technique. The integration provides future desired values of engine and vehicle speed —values which would occur were the engine driving the simulated vehicle through the simulated drivetrain components. The desired (predicted) engine speed becomes a speed command for the dynamometer, and the desired (predicted) vehicle speed can be used as a simulated vehicle speed if it is desired to make the vehicle speed conform to a predefined schedule.

The emulation system of this invention permits realistic testing of an engine on any drive schedule, and is therefore well suited to engine development work. In addition, the effect of adjustments in transmission calibration, including shift pattern, can conveniently be determined by appropriately adjusting the emulation parameters.

IN THE DRAWINGS

Figure 3:
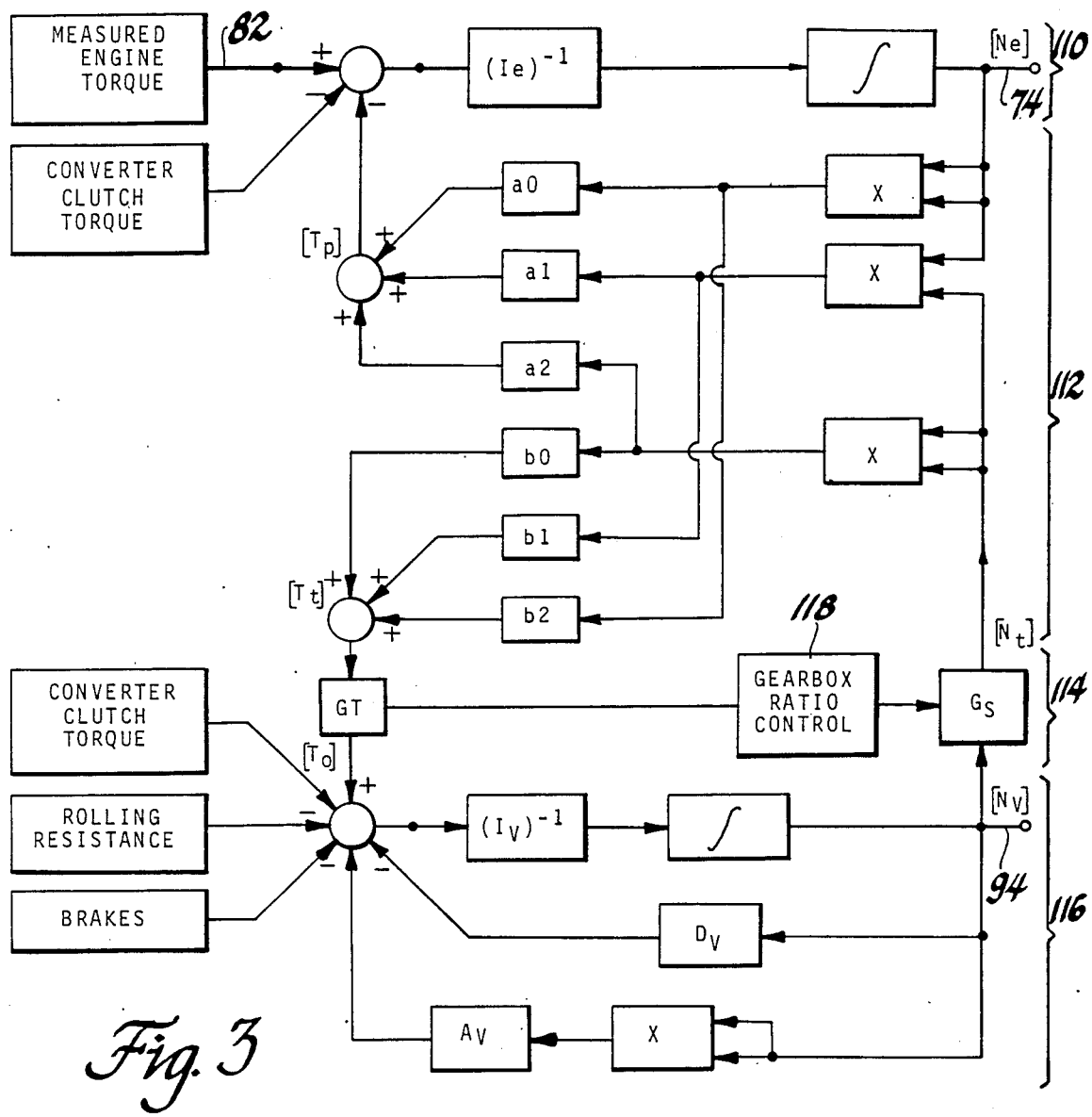
Figure 4:
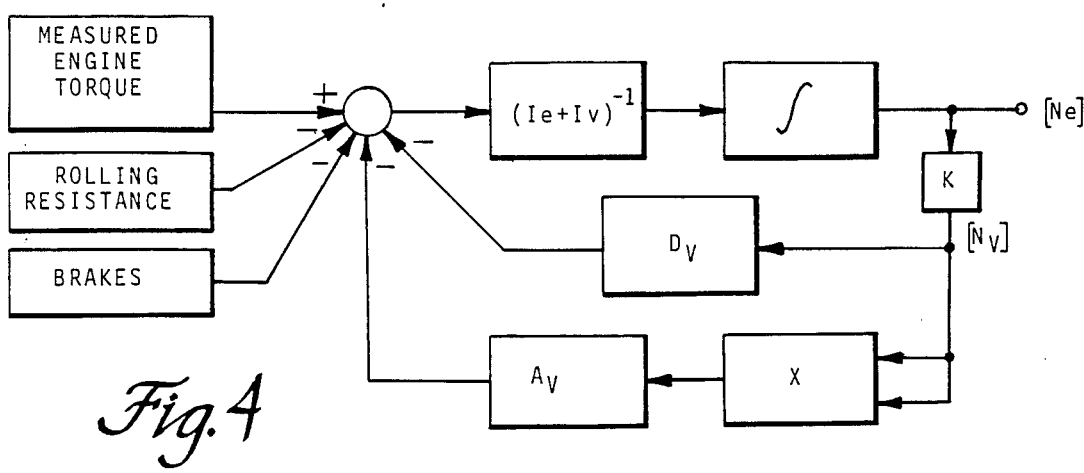

FIGS. 3 and 4 are control system diagrams of the emulation system of this invention. FIG. 3 depicts the system with the converter clutch disengaged or partly engaged; FIG. 4 depicts the system with the converter clutch fully engaged.

Figure 1:
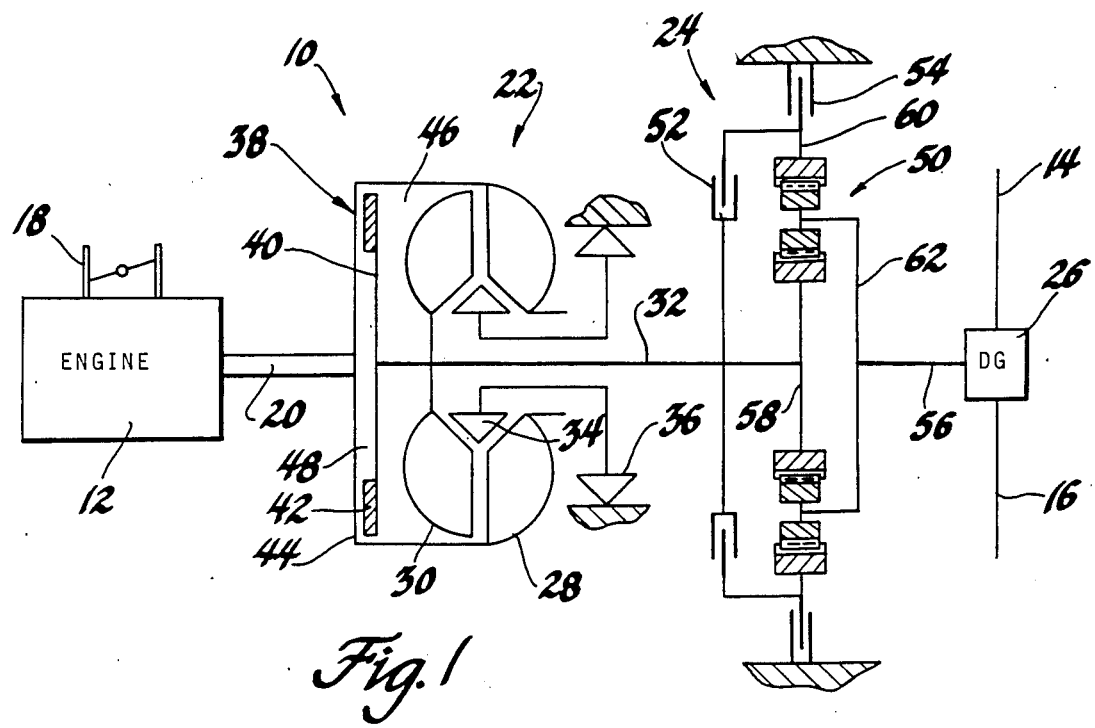
FIG. 1 is a schematic diagram of a motor vehicle drivetrain including an engine, a fluid torque converter with converter clutch, and a multiple gear ratio automatic transmission.
Figure 5:
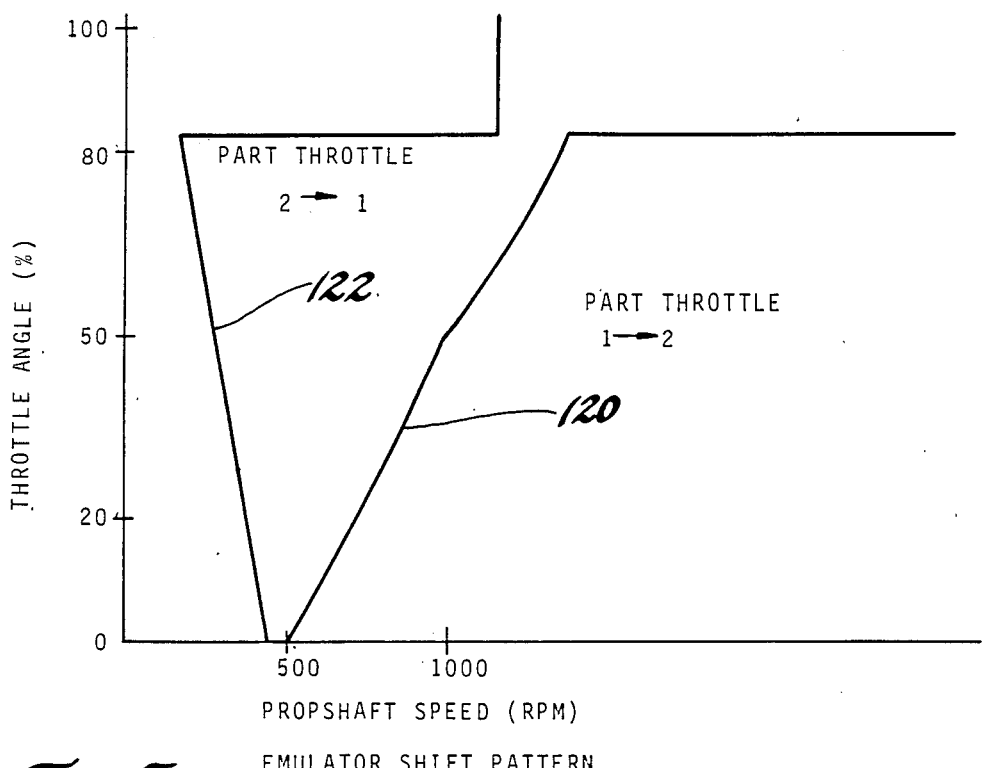

FIG. 5 is a graphical representation of a shift pattern for determining gear ratio selection in the automatic shift transmission of FIG. 1.

Figure 6:
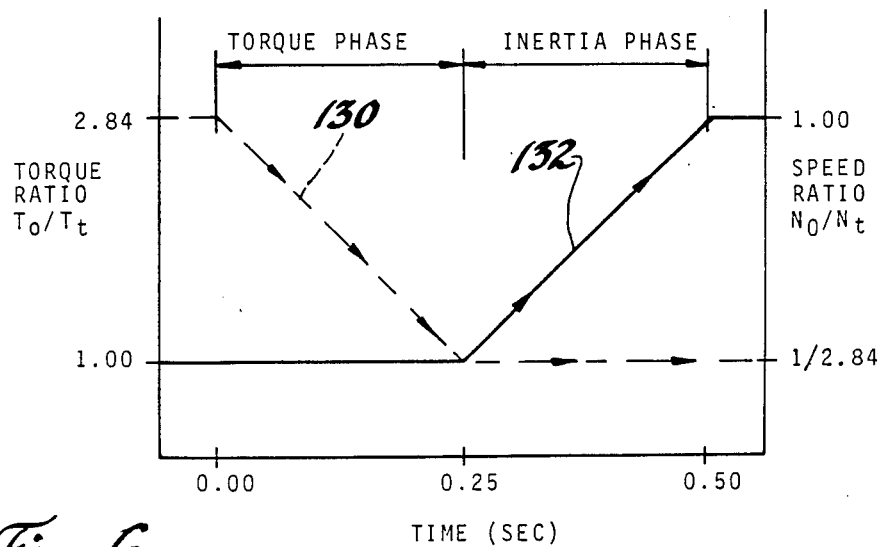

FIG. 6 is a graphical representation of the torque and speed changes effected during a ratio shift of the transmission of FIG. 1.

FIGS. 7-12 depict flow diagrams representative of suitable computer program instructions for carrying out the emulation functions of this invention with a microcomputer based controller. Referring now to the drawings, and more particularly to FIG. 1, the reference numeral 10 generally designates a motor vehicle drivetrain through which an internal combustion engine 12 drives a pair of propshafts 14 and 16. The engine 12 includes a throttle mechanism 18 for controlling the torque applied to the drivetrain 10 through the shaft 20, and the propshafts 14–16 are connected to wheels (not shown) which engage a road surface to propel the vehicle. The drivetrain 10 comprises various conventional elements, including a torque converter mechanism 22, a multiple gear ratio automatic transmission 24, and a differential gearset (DG) 26.

The torque converter mechanism 22 includes an impeller or pump element 28 connected to the engine output shaft 20 for rotation therewith, and a turbine element 30 connected to the converter output shaft 32. The turbine element 30 is adapted to be rotatably driven by the impeller element 28 by means of fluid transfer therebetween. A stator element 34 directs the fluid which couples the impeller 28 and turbine 30, and is connected through a one-way device 36 to the housing of transmission 24.

The torque converter mechanism 22 functions in either a converter mode or a coupling mode. In the converter mode, the torque converter mechanism 22 effects a torque multiplication, and the converter output torque transmitted through shaft 32 exceeds the engine output torque transmitted through shaft 20. In such mode, the turbine speed $N_t$ is less than approximately 88% of the engine speed $N_e$. In the coupling mode, the torque converter mechanism 22 ceases to effect a torque multiplication, and the speed and torque ratios across the converter approach unity.

The torque converter mechanism 22 also includes a clutching mechanism 38 engageable to form a rigid mechanical connection between the engine output shaft 20 and the converter output shaft 32. The clutching mechanism 38 comprises a clutch plate 40 splined to the converter output shaft 32, and a friction surface 42 adapted to contact the inner surface of the impeller housing 44 when the clutching mechanism 38 is engaged. The clutching mechanism 38 is hydraulically engaged and disengaged by controlling the fluid pressure in an apply chamber 46 and a release chamber 48.

The simplified automatic shift multiple gear ratio transmission 24 comprises a planetary gearset 50 and two alternately engageable torque establishing devices 52 and 54 for providing two distinct torque transmission paths between converter output shaft 32 and a transmission output shaft 56. The converter output shaft 32 continuously drives sun element 58 of the gearset 50, and selectively drives the ring element 60 via the torque establishing device 52. The transmission output shaft 56 is driven by the planet element carrier 62. The ring element 60 is selectively grounded to the transmission housing by the torque establishing device 54.

A first speed ratio, referred to herein as first gear, is provided when the torque establishing device 52 is disengaged and the torque establishing device 54 is engaged to ground the ring element 60. This defines an underdrive condition in which the speed ratio $N_o/N_t$ between the shafts 56 and 32 is less than unity, and the torque ratio $T_o/T_t$ between the shafts 56 and 32 is greater than unity. For the purpose of this description, it will be assumed that the speed ratio $N_o/N_t$ provided by the first gear is 1/2.84, and the corresponding torque ratio $T_o/T_t$ is the reciprocal 2.84/1.

A second speed ratio, referred to herein as second gear, is provided when the torque establishing device 54 is disengaged to release the ring element 60 and the torque establishing device 52 is engaged to couple the sun and ring elements 58 and 60. This defines a direct drive condition in which the speed and torque ratios between the shafts 56 and 32 are both 1:1.

Upshifting from first gear to second gear involves concurrent progressive engagement of torque establishing device 52 and disengagement of torque establishing device 54. Downshifting from second gear to first gear involves concurrent progressive engagement of torque establishing device 54 and disengagement of torque establishing device 52. In either case, the shift comprises two primary phases —a torque phase and an inertia phase. In the torque phase, the shift is initiated, and the torque capacities of the devices 52 and 54 approach their target values without producing changes in the gearset element speeds. In the inertia phase, the gearset elements change from their preshift speeds to their postshift speeds. In an upshift, the torque phase precedes the inertia phase; in a downshift, the inertia phase precedes the torque phase.

Figure 2:
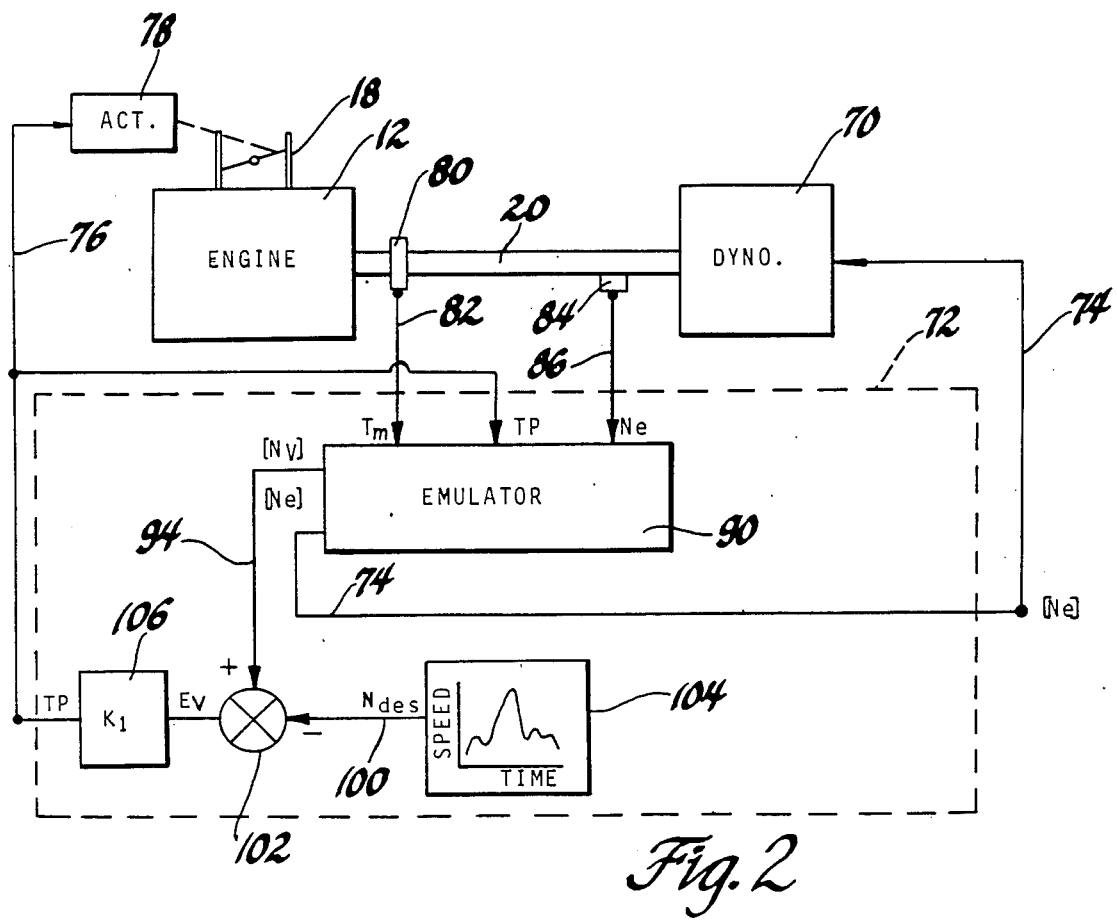
FIG. 2 is a control system diagram depicting a laboratory test cell arrangement for using the emulation system of this invention to emulate vehicle and drivetrain behavior on a predetermined driving schedule.

FIG. 2 depicts a control system diagram of a laboratory set up for emulating the various drivetrain elements described above in reference to FIG. 1. In the emulation, the output shaft 20 of engine 12 is connected to a dynamometer 70. The controller 72 is responsive to measured engine torque and speed, and operates to control the dynamometer speed via line 74 and the engine throttle position via line 76 and actuator 78. The dynamometer 70 includes an internal speed regulation controller (not shown) for maintaining its speed in accordance with the signal on line 74. The engine output torque is measured by torque transducer 80, which may be a conventional strain gauge device, and a signal $T_m$ corresponding thereto is supplied to controller 72 via line 82. The speed of shaft 20 is measured by a speed transducer 84, and a signal $N_e$ corresponding thereto is supplied to controller 72 via line 86.

The controller 72 includes an emulator 90 which operates in response to the measured engine torque signal $T_m$ on line 82 to simulate the loads which would be imposed on engine 12 were it mounted in a motor vehicle having a drivetrain of the type generally depicted in FIG. 1. The engine speed signal $N_e$ is also provided as an input to emulator 90, and is used for a number of purposes, including the compensation of measured engine torque for engine acceleration. As explained below, the emulator 90 is preferably mechanized with a digital computer.

The emulator 90 determines what the engine speed would be on a real time basis, and generates simulated engine and vehicle speed signals [$N_e$] and [$N_v$] on lines 74 and 94, respectively. The simulated vehicle speed signal [$N_v$] on line 94 is compared with a desired vehicle speed signal $N_{des}$ on line 100 at summing junction 102 to generate a vehicle speed error signal $E_v$. The desired speed signal $N_{des}$ may be arbitrarily determined, but is typically a generated in accordance with a predefined schedule as indicated at block 104. In a particularly useful application of the present invention, the predefined schedule may be the Federal Urban Driving Schedule. A gain factor $K_1$ is applied to the error signal $E_v$ as indicated at block 106, and the result is applied as a throttle position command TP to the throttle actuator 78 via line 76. The line 76 is also applied to emulator 90 as an indication of the throttle position for use in gear ratio selection, as described below.

With the control arrangement described above, the engine 12 operates as though it were mounted in a driven vehicle and constrained to follow a predefined speed schedule. This arrangement can be advantageously used in efficiency and emission studies to determine the effect of various engine and engine control modifications. Moreover, the effect of various transmission and torque converter parameter modifications may also be determined as will later be described. This invention is directed to a system of emulation which provides this flexibility and which correlates well with real world driving conditions.

FIG. 3 depicts a control system diagram for emulator 90 in the general case where the converter clutch 38 is disengaged or partially engaged. In such operation, the torque converter 22 is active (whether in converter or coupling modes) and must be accounted for. The system diagram represents nonlinear differential equations descriptive of the drivetrain and vehicle behavior. The equations are coupled by the transmission speed and torque ratios and are solved according to this invention to derive emulated engine and vehicle speeds. As in FIG. 2, the measured engine torque $T_m$ is applied via line 82, and the simulated engine and vehicle speeds [$N_e$] and [$N_v$] are outputted via lines 74 and 94.

The general case system diagram comprises a portion 110 directed to engine 12, a portion 112 directed to torque converter 22, a portion 114 directed to transmission 24, and a portion 116 directed to the vehicle.

The engine portion 110 is derived from the expression:

$$I_e * d([N_e])/dt = T_e - [T_p] - [T_c]$$

which relates the actual engine torque $T_e$ to acceleration $d([N_e])/dt$ of the simulated engine inertia $I_e$. The term [$T_p$] represents the simulated load of the torque converter pump (impeller) element 28, and the term [$T_c$] represents the simulated load (if any) of the converter clutch mechanism 38. Such expression is solved for acceleration, and integrated to yield a simulated engine speed [$N_e$] as follows:

$$[N_e] = (1/I_e) * \int (T_e - [T_p] - [T_c]) \, dt$$

The torque converter portion 112 generates the simulated pump load term [$T_p$] referred to above, and a simulated turbine torque term [$T_t$] representative of the torque converter output torque. The terms [$T_p$] and [$T_t$] when the torque converter 38 is in the converter mode are derived from the expressions:

$$[T_p] = (a_0 * [N_e]^2) + (a_1 * [N_e] * [N_t]) + (a_2 * [N_t]^2)$$

$$[T_t] = (b_0 * [N_e]^2) + (b_0 * [N_e] * [N_t]) + (b_2 * [N_t]^2)$$

where the coefficients $a_0$–$a_2$ and $b_0$–$b_2$ are empirically determined for a given torque converter geometry under steady state operating conditions in the converter mode. In the coupling mode, the terms [$T_p$] and [$T_t$] are equal and opposite, and a single set of coefficients $c_0$–$c_2$ is used. The turbine speed term [$N_t$] used in solving the above expressions is obtained from the transmission portion 114 of the system diagram, as explained below.

The transmission portion 114 concerns the speed ratio $N_o/N_t$ and the torque ratio $T_o/T_t$ established by the transmission 24. The torque ratio is applied to the simulated turbine torque term [$T_t$] to determine the simulated output torque [$T_o$], and the speed ratio is applied to the simulated vehicle speed term [$N_v$] to determine the simulated turbine speed [$N_t$]. The simulated turbine torque term [$T_t$] is obtained from the torque converter portion 112 as described above, and the simulated vehicle speed term [$N_v$] is obtained from the vehicle portion 116, as will be described below.

The transmission portion 114 designates the transmission ratio control which effects gear ratio shifting in transmission 24. The changes in the torque and speed ratios is the result of shifting —the block 118 includes the functions of ratio selection and shift progression. These functions are described below in reference to FIGS. 5 and 6, respectively.

The vehicle portion 116 is derived from the expression:

$$[T_o] = (I_v * d([N_v])/dt + (D_v * [N_v])) = (A_v * [N_v]^2) + [T_r] - [T_c]$$

which relates simulated output torque [$T_o$] to acceleration $d([N_v])/dt$ of the vehicle inertia $I_v$. The term ($D_v * [N_v]$) represents viscous damping, the term ($A_v * [N_v]^2$) represents aerodynamic drag, the term [$T_r$] represents simulated braking and tire rolling resistance, and the term [$T_c$] represents the simulated load (if any) of the converter clutch mechanism 38. Such expression is solved for acceleration, and integrated to yield a simulated vehicle speed [$N_v$] as follows:

$$[N_v] = (1/I_v) * \int ([T_o] - (D_v * [N_v]) - (A_v * [N_v]^2), - [T_r] + [T_c]) \, dt$$

The simulated converter clutch torque term [$T_c$] is a determined as a function of the net apply pressure P operating on the clutch plate 40 and the dynamic coefficient of friction u between the friction surface 42 and the impeller housing 44 according to the expression:

$$[T_c] = P * u$$

The dynamic coefficient of friction u is defined as:

$$u = u_o - B * ([N_e] - [N_t])$$

where $u_o$ is the static coefficient of friction and B represents the relationship between friction and slip speed ($[N_e] - [N_t]$).

As in most production vehicles, the converter clutch 38 is only applied when second (high) gear is engaged, and then only if the vehicle speed is greater than a reference speed, the throttle is within a specified range, and the vehicle brakes are not applied. When conditions indicate that the converter clutch 38 should be applied, the apply pressure P is linearly increased up to a maximum value to effect engagement thereof. When conditions indicate that the clutch 38 should be disengaged, the apply pressure P is quickly reduced to zero.

As indicated by the control system diagram, the nonlinear differential equations for the engine and the vehicle are coupled through the torque converter and the transmission, and are solved simultaneously to yield simulated engine and vehicle speeds. The simulated engine and vehicle speeds may be advantageously used in closed loop dynamometer and engine throttle controls as shown in FIG. 2.

FIG. 4 depicts a control system diagram for emulator 90 in a special case where the converter clutch 38 is fully engaged. In such operation, the torque converter 22 is inactive, and can be ignored. In addition, it is assumed that ratio shifting does not occur under such conditions. Thus, the vehicle and engine inertias $I_v$ and $I_e$ can be lumped together as indicated. The combined expression:

$$[T_o] = ((I_v + I_e) * d([N_e])/dt) + (D_v * [N_e]) + (A_v * [N_e]^2) + [T_r]$$

relates output or propshaft torque $[T_o]$ to acceleration $d([N_e])/dt$ of the engine and vehicle inertia $(I_v + I_e)$. Such expression is solved for acceleration, and integrated to yield a simulated engine speed $[N_e]$ as follows:

$$[N_e] = (1/(I_v + I_e)) * \int (([T_o] - (D_v * [N_e])) - (A_v * [N_e]^2) - [T_r]) \, dt$$

The emulation for ratio selection is graphically depicted in FIG. 5. The trace 120 represents the criteria for initiating a part throttle upshift from first gear to second gear. The trace 122 represents the criteria for initiating a part throttle downshift from second gear to first gear. The separation between the traces 120 and 122 provides hysteresis. If first gear is engaged, and the throttle position %T and simulated vehicle speed $[N_v]$ define a point to the right of trace 120, an upshift is initiated. If second gear is engaged, and the throttle position %T and simulated vehicle speed $[N_v]$ define a point to the left of trace 122, a downshift is initiated. Ratio selection in an automatic transmission is conventionally performed in this manner.

As indicated above in reference to FIG. 1, ratio shifting comprises distinct torque and inertia phases. In upshifts, the torque phase precedes the inertia phase; in downshifts, the inertia phase precedes the torque phase. In the emulation of this invention, it is assumed that both the torque and speed ratios change linearly with respect to time during the shift, and that the torque and inertia phases occupy equal and predefined time intervals. In a mechanization of this invention, each shift was completed in 0.50 seconds —0.25 seconds being allotted to the torque phase, and 0.25 seconds being allotted to the inertia phase.

The emulation for the progression of an upshift from first gear to second gear is graphically depicted in FIG. 6. The broken trace 130 represents the torque ratio $T_o/T_t$, and the solid trace 132 represents the speed ratio $N_o/N_t$. Prior to the shift, first gear is engaged —the torque ratio is 2.84:1 and the speed ratio is 1:2.84. At time 0.00, the shift is initiated. In the interval between 0.00 and 0.25 seconds, the torque phase occurs, and the torque ratio is linearly reduced to the second gear torque ratio of 1:1. In the interval between 0.25 and 0.50, the inertia phase occurs, and the speed ratio is linearly increased to the second gear speed ratio of 1:1. For a downshift from second gear to first gear, the sequence is reversed.

Figure 7:
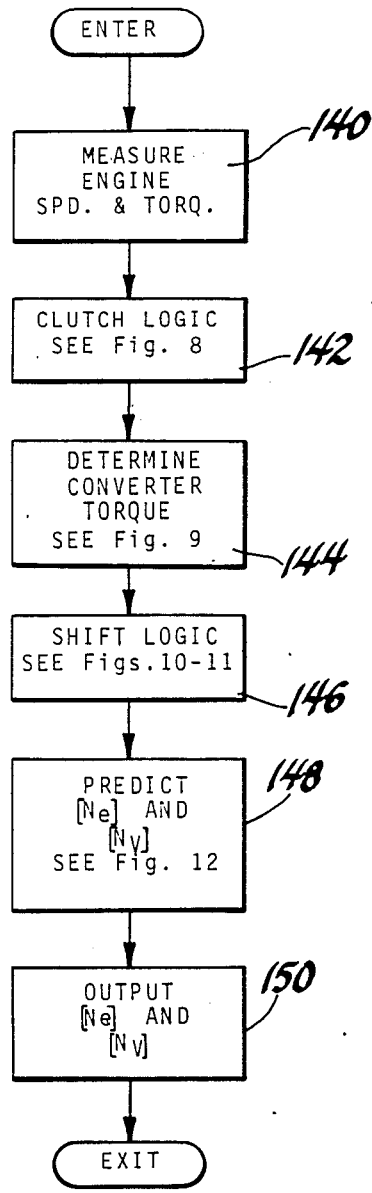

FIG. 7 depicts a flow diagram representative of computer program instructions for implementing the control functions of emulator 90 with a computer based controller. The program is periodically executed at a predetermined repetition rate in accordance with the computing capability of the controller. In a mechanization of this invention, good performance was achieved with a repetition rate of approximately 18 Hz.

In each execution of the program, the functions identified by the instruction blocks 140-150 are carried out in sequence. First, the engine torque and speed measurements are read as indicated at instruction block 140. As will be understood by those skilled in the art, this involves a correction of the measured torque $T_m$ for engine acceleration. Then, parameters pertinent to the operation of converter clutch 38 are determined and used to develop a simulated converter clutch torque term $[T_c]$. This function is represented generally by the instruction block 142 (clutch logic), and is described in greater detail in the flow diagram of FIG. 8 as indicated.

Then the torque converter mode of operation (that is, coupling or converter) is determined and the simulated torque terms $[T_t]$ and $[T_p]$ computed. This function is represented generally by the instruction block 144 (determine converter torque) and is described in greater detail in the flow diagram of FIG. 9 as indicated.

Then the ratio selection and shift progression functions are emulated. This function is represented generally by the instruction block 146 (shift logic) and is described in greater detail in the flow diagram of FIGS. 10-11 as indicated.

Then the coupled nonlinear differential equations representing the drivetrain and the vehicle are solved to provide simulated engine and vehicle speed terms. This function is represented generally by the instruction block 148 (compute engine and vehicle speed) and is described in greater detail in the flow diagram of FIG. 12 as indicated. Lastly, instruction block 150 is executed to output simulated engine and vehicle speed terms $[N_e]$ and $[N_v]$ for use in the control system of FIG. 2.

Figure 8:
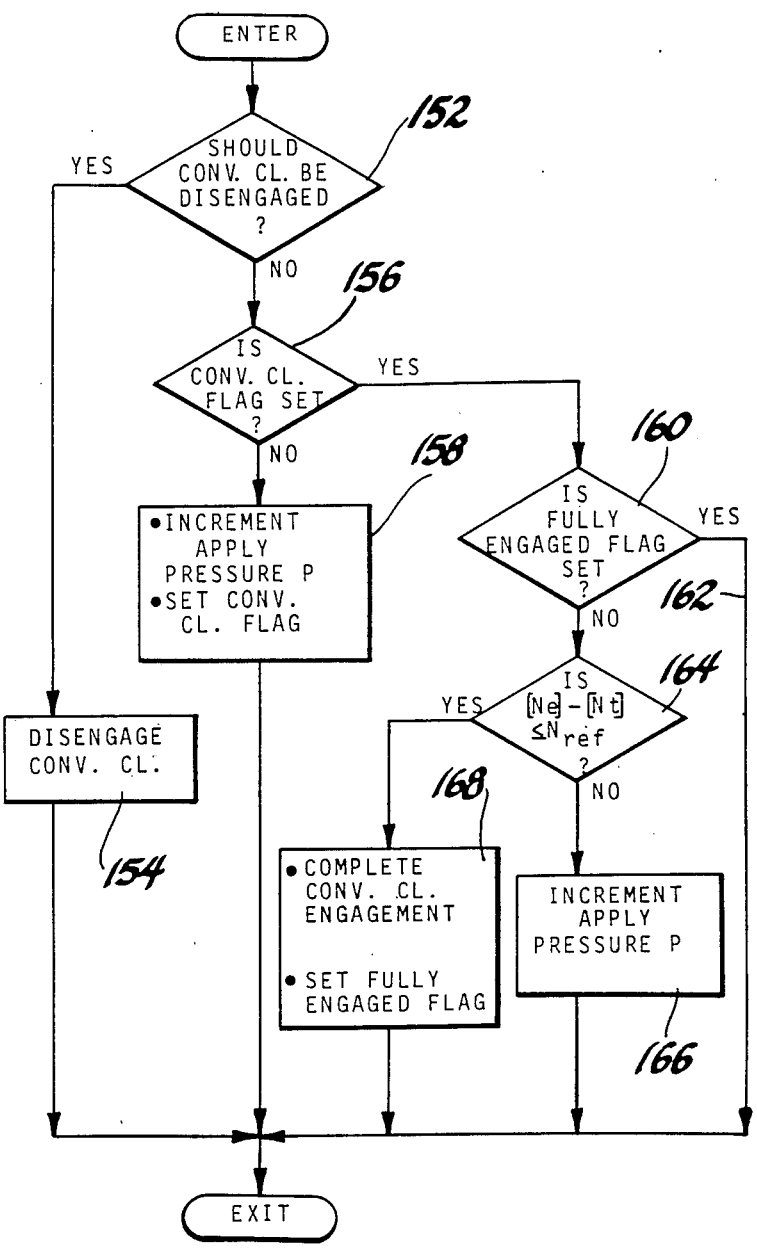

Referring now more particularly to the clutch logic function of FIG. 8, the decision block 152 tests the various operating parameters, including throttle position and vehicle speed to determine if the converter clutch 38 should be disengaged. If so, the instruction block 154 is executed to disengage the converter clutch 38 by quickly returning the apply pressure P to zero. If the decision block 152 is answered in the negative, the converter clutch 38 is either partially or fully engaged, as indicated by the status of a converter clutch flag. If the flag is not set, as determined at decision block 156, the converter clutch 38 is already disengaged and the instruction block 158 is executed to initiate the increase in apply pressure P and to set the converter clutch flag.

If it is determined at decision block 156 that the converter clutch flag is set, the converter clutch 38 is engaged or partially engaged and the decision block 160 is executed to determine if a fully engaged flag is set. If so, the converter clutch 38 is fully engaged and the remainder of the flow diagram is skipped as indicated by the flow diagram line 162. If the fully engaged flag is not set, the converter clutch 38 is partially engaged and the decision block 164 is executed to determine if the simulated slip speed across the converter clutch 38 (that is, $[N_e] - [N_t]$) is less than or equal to a reference slip speed $N_{ref}$. If not, the instruction block 166 is executed to further increment the clutch apply pressure P. If so, the instruction block 168 is executed to set the fully engaged flag and to raise the apply pressure P to its maximum value to complete the clutch engagement.

Figure 9:
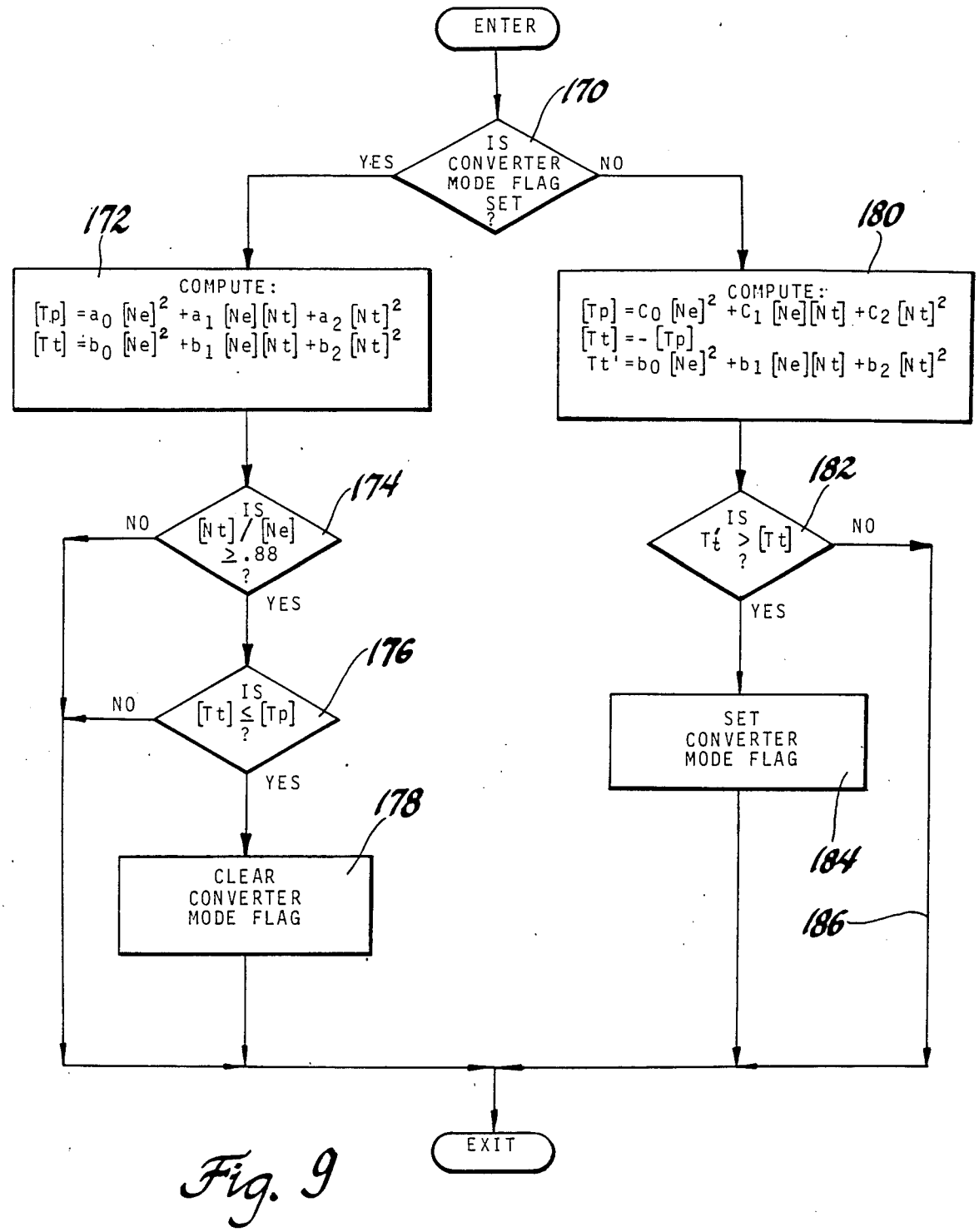

Referring now more particularly to the torque converter emulation function of FIG. 9, the decision block 170 is executed to determine if a converter mode flag is set. The converter mode flag indicates whether the torque converter 22 is operating in the converter mode (converter mode flag set), or the coupling mode (converter mode cleared). If the decision block 170 is answered in the affirmative, the torque converter 22 is operating in the converter mode and the instruction block 172 is executed to compute the simulated pump and turbine torque terms $[T_p]$ and $[T_t]$ as indicated. Thereafter, the decision blocks 174-176 are executed to determine if the torque converter is entering the coupling mode. In particular, the instruction block 174 determines if the speed ratio $[N_t]/[N_e]$ across the torque converter 22 is greater than or equal to 0.88, and decision block 176 determines if the simulated turbine torque term $[T_t]$ is less than or equal to the simulated pump torque term $[T_p]$. If both conditions are met, the instruction block 178 is executed to clear the converter mode flag.

If the decision block 170 is answered in the negative, the torque converter 22 is operating in the coupling mode and the instruction block 180 is executed to compute the simulated pump and turbine torque terms $[T_p]$ and $[T_t]$, such terms being equal and opposite as indicated. In addition, a converter mode torque term (designated $T_t'$) is computed and compared with the coupling mode torque term $[T_t]$ in order to test for a return to the converter mode. To this end, decision block 182 determines if the converter mode torque term $T_t'$ is greater than the coupling mode torque term $[T_t]$. If so, the torque converter has returned to the converter mode, and the instruction block 184 is executed to set the converter mode flag. If not, the execution of instruction block 184 is skipped as indicated by the flow diagram line 186.

Figure 10:
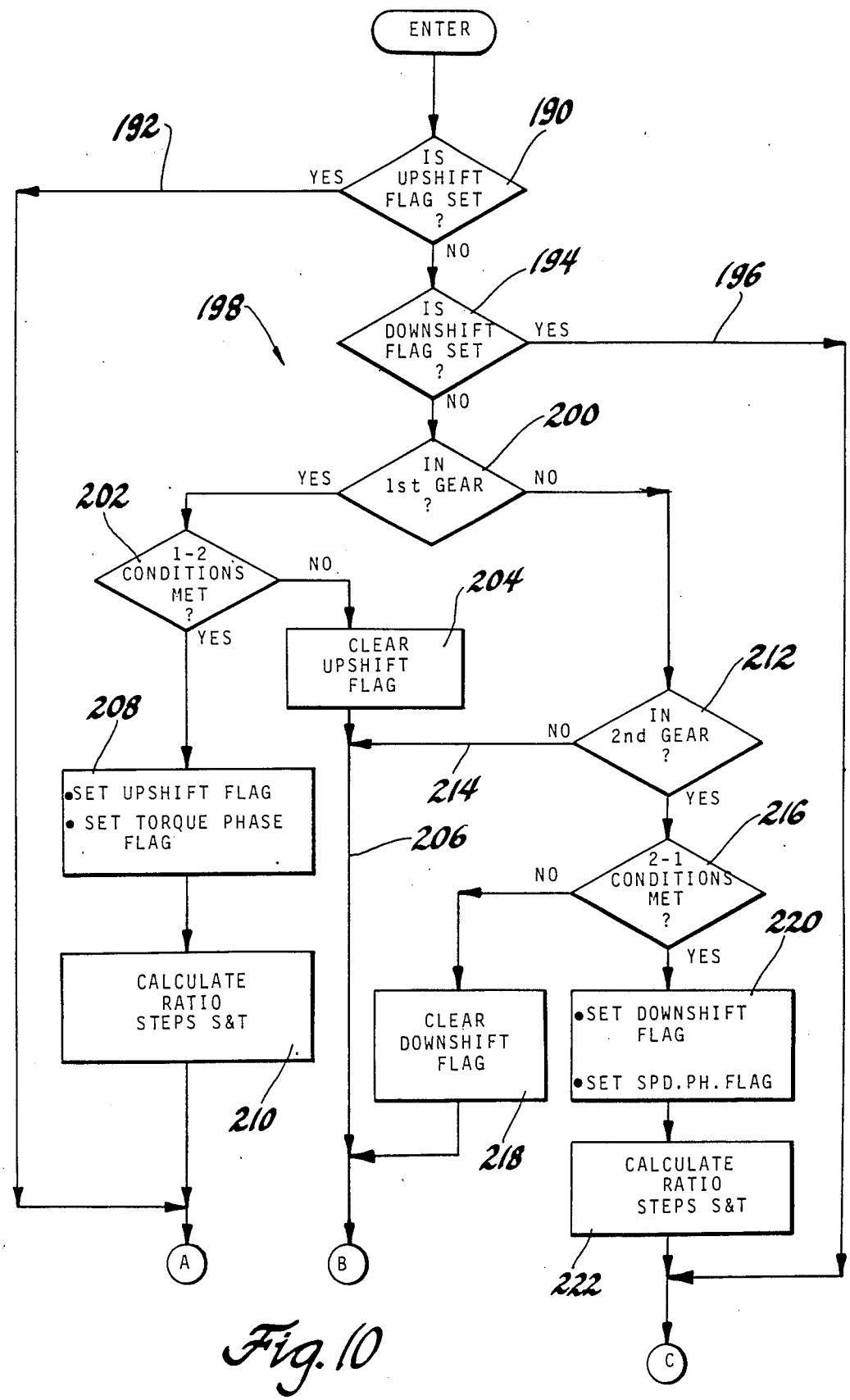
Figure 11:
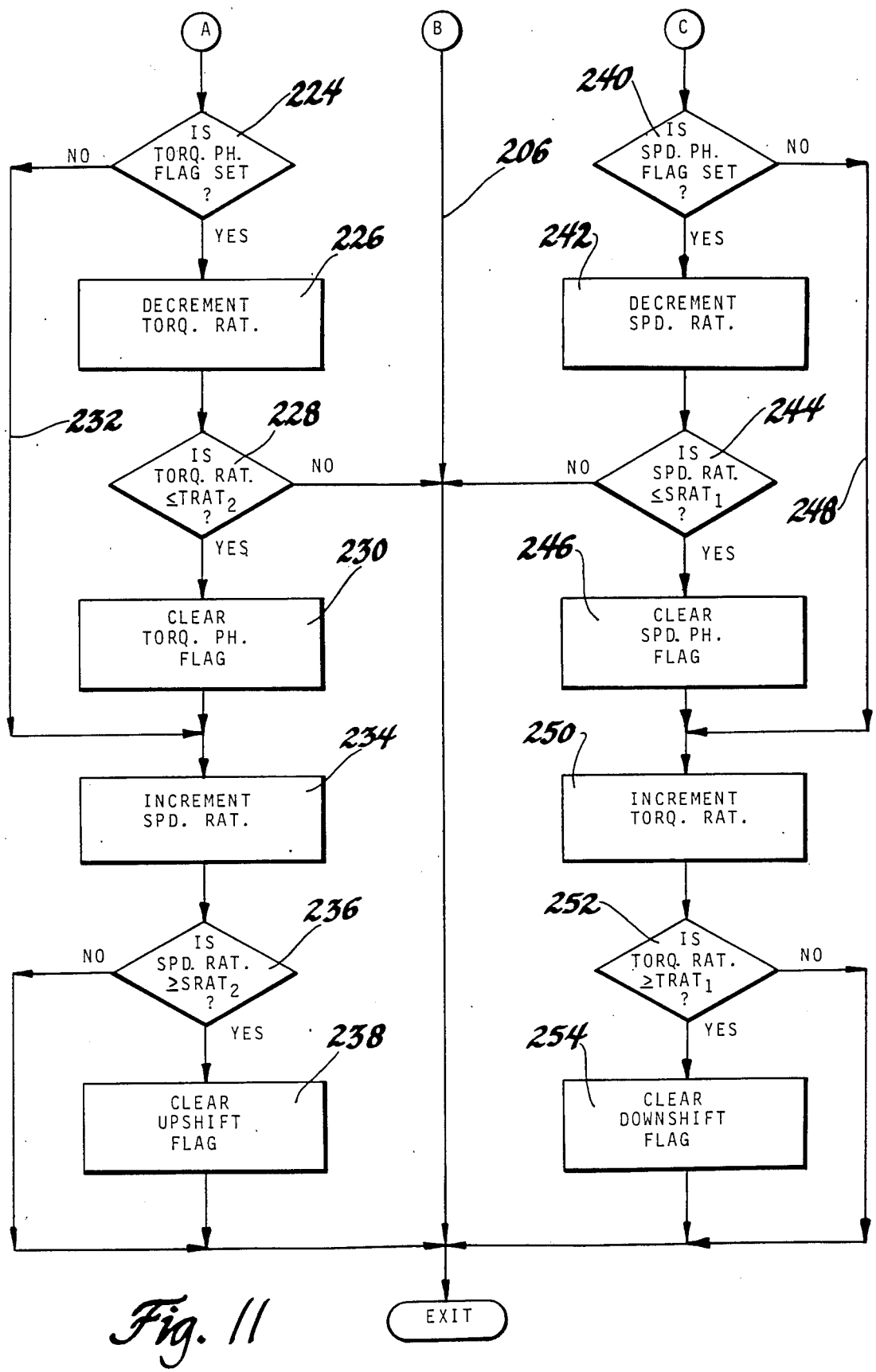

Referring now more particularly to the shift logic function of FIGS. 10-11, the decision block 190 is first executed to determine if an upshift flag is set. If so, an upshift is in progress and the controller is directed to a flow diagram portion pertaining to upshift progression as indicated by the flow diagram line 192 and the circled letter A. If not, the decision block 194 is executed to determine if the downshift flag is set. If so, a downshift is in progress and the controller is directed to a flow diagram portion pertaining to downshift progression as indicated by the flow diagram line 196 and the circled letter C. If neither the upshift nor the downshift flag is set, no shifts are in progress and the flow diagram portion generally designated by the reference numeral 198 is executed to determine if an upshift or a downshift is required.

Referring particularly to the flow diagram portion 198, the decision block 200 is first executed to determine if the first gear of transmission 24 is engaged. If so, the decision block 202 is executed to determine if the 1-2 upshift criteria have been met. This involves a comparison of the throttle position and vehicle speed with empirically determined shift schedules as described above in reference to FIG. 5.

If the conditions are not met, the instruction block 204 is executed to clear the upshift flag and the remainder of the routine is skipped as indicated by the flow diagram in line 206 and the circled letter B. If the upshift criteria have been satisfied, the instruction blocks 208-210 are executed to set the upshift flag, to set a torque phase flag and to calculate speed and torque ratio steps S and T. The speed and torque steps S and T are determined in relation to the loop time of the controller so that the inertia and torque phases occupy the predetermined intervals described above in reference to FIG. 6. Thereafter, the portion of the flow diagram pertaining to upshift progression is executed as indicated by the circled letter A.

If the decision block 200 is answered in the negative, the decision block 212 is executed to determine if the second gear of transmission 24 is engaged. If not, the remainder of the routine is skipped as indicated by the flow diagram line 214 and circled letter B. If the transmission is in second gear, the decision block 216 is executed to determine if the downshift criteria are met as described in reference to FIG. 5. If not, the instruction block 218 is executed to clear the downshift flag and the remainder of the routine is skipped as indicated by the flow diagram line 206 and the circled letter B.

If the downshift criteria are met, the instruction blocks 220-222 are executed to set the downshift flag, to set the speed phase flag and to calculate speed and torque ratio steps S and T. Thereafter, the portion of the flow diagram pertaining to downshift progression is executed as indicated by the circled letter C.

The portion of the flow diagram pertaining to upshift progression is depicted in FIG. 11 under the circled letter A. If the torque phase flag is set, as determined at decision block 224, the torque phase of the upshift is active and the instruction block 226 is executed to decrease the torque ratio by the torque step T. Then the decision block 228 is executed to determine if the torque ratio is less than or equal to the torque ratio of second gear, $TRAT_2$. If not, the torque phase is still active, and the remainder of the routine is skipped as indicated by the flow diagram line 206. If so, the torque phase is complete and the instruction block 230 is executed to clear the torque phase flag. If the decision block 224 is answered in the negative, the inertia phase of the upshift is active and the execution of the blocks 226-230 is skipped by the flow diagram line 232. So long as the inertia phase of the upshift is active, the instruction block 234 is executed to increase the speed ratio by the speed step S. Then the decision block 236 is executed to determine if the speed ratio is greater than or equal to the speed ratio of second gear $SRAT_2$. If so, the inertia phase is complete and the instruction block 238 is executed to clear the upshift flag.

The portion of the flow diagram pertaining to downshift progression is depicted in FIG. 11 beneath the circled letter C. The decision block 240 is first executed to determine if the speed phase flag is set. If so, the speed phase of the downshift is active and the instruction block 242 is executed to decrease the speed ratio by the speed step S computed at instruction block 222. Then the decision block 244 is executed to determine if the speed ratio is less than or equal to the speed ratio for first gear, $SRAT_1$. If not, the speed phase is still active, and the remainder of the routine is skipped as indicated by the flow diagram line 206. If so, the speed phase of the shift is complete and the instruction block 246 is executed to clear the speed phase flag. If the decision block 240 is answered in the negative, the torque phase of the upshift is active and the blocks 242-246 are skipped as indicated by the flow diagram line 248.

So long as the torque phase of the downshift is active, the instruction block 250 is executed to increase the torque ratio by the torque step T computed at instruction block 222. Then the decision block 252 is executed to determine if the torque ratio is greater than or equal to the torque ratio for first gear $TRAT_1$. If so, the torque phase of the shift is complete and the instruction block 254 is executed to clear the downshift flag.

Figure 12:
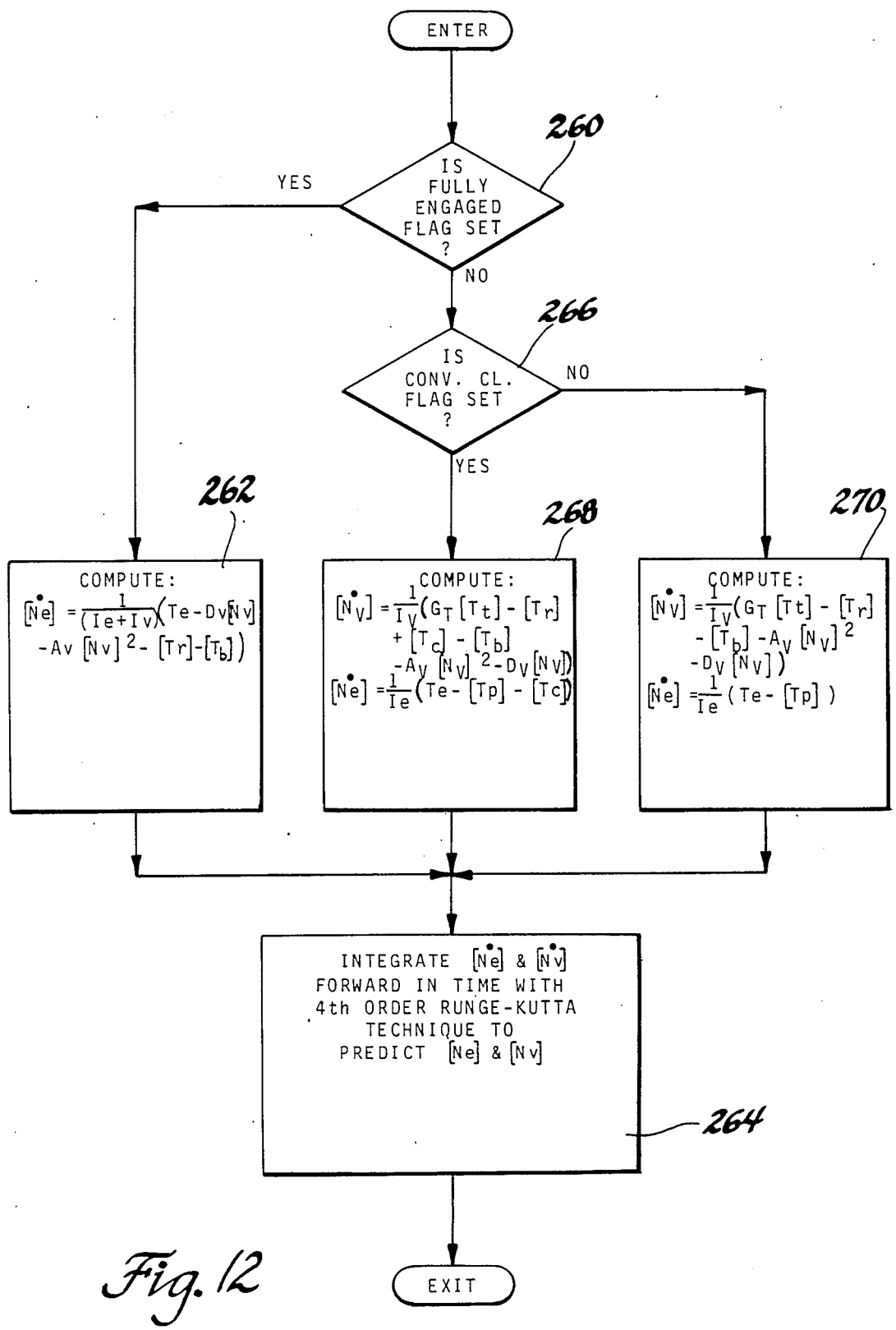

Referring now more particularly to the speed computation functions of FIG. 12, the decision block 260 is first executed to determine if the fully engaged flag is set. If so, the converter clutch 38 is fully engaged. In such case, the engine and vehicle accelerations are equal and the instruction block 262 is executed to compute a single acceleration term as described above in reference to the control system diagram of FIG. 4. If the decision block 260 is answered in the negative, the decision block 266 is executed to determine if the converter clutch flag is set. If so, the converter clutch 38 is partially engaged and the instruction block 268 is executed to compute the acceleration expressions for the engine and vehicle including the effect of the clutch torque term [$T_c$]. If the decision block 266 is answered in the negative, the converter clutch 38 is released and the instruction block 270 is executed to compute the engine and vehicle acceleration terms without accounting for the converter clutch torque term [$T_l$].

Once the appropriate engine and vehicle acceleration expressions have been computed, the instruction block 272 is executed to integrate the expressions forward in time using a fourth-order RUNGE-KUTTA technique. This technique assumes that the measured engine torque remains substantially constant between integrations and effectively predicts what the engine and vehicle speeds should be at the time of the next integration. The speed command for the dynamometer is determined in relation to the predicted engine speed, and the simulated vehicle speed [$N_v$] is determined in relation to the predicted vehicle speed. The periodicity of integration (and therefore torque sampling) is limited by the computing capability of the controller; in a mechanization of the present invention substantially as described herein, an accurate and repeatable emulation was successfully achieved with an integration period of 56 milliseconds (17 Hz).

In the manner described above, the emulation system of this invention provides accurate emulation of a motor vehicle and drivetrain components including a fluidic torque converter and clutch and a shiftable ratio automatic transmission. The invention thereby permits reliable testing and evaluation of the performance of a motor vehicle engine operating under any driving schedule, spontaneous or predetermined. Moreover, suitable adjustment of the emulation parameters may be made to determine the impact of variation in drivetrain calibrations such as shift pattern generation and torque converter characteristics.

While the invention has been described in reference to the illustrated embodiment, it will be recognized that various modifications thereto will occur to those skilled in the art. By way of example, the emulation system of this invention is not limited to the transmission configuration depicted in FIG. 1, but is applicable to any shiftable ratio transmission wherein the ratio shifting can be modeled in terms of speed and torque ratio variation. It will be understood that emulation systems incorporating modifications such as described above may fall within the scope of this invention, which is defined by the appended claims.

The embodiments of the invention in which an exclusive property or privilege is claimed are defined as follows:

We claim:

1. In a motor vehicle engine testing arrangement including a motor vehicle engine and an electric dynamometer coupled to the output shaft of such engine and adapted to regulate the engine speed in accordance with a speed control signal applied thereto, a method of operating the dynamometer so as to emulate the combined effect of a motor vehicle and conventional motor vehicle drivetrain elements including a fluidic torque converter and a shiftable ratio automatic transmission, such method comprising the steps of:

defining first and second differential equations relating the ability of the drivetrain input torque to accelerate the engine inertia, and the ability of the drivetrain output torque to overcome the road load and accelerate the vehicle inertia;

modeling the combined operation of a fluidic torque converter and a shiftable ratio automatic transmission, and coupling the first and second differential equations therewith such that the drivetrain input torque is determined as a function of measured engine output torque and the load that would be imposed on the engine by the torque converter and the drivetrain output torque is determined as a function of the transmission output torque and the road load of the vehicle;

periodically integrating the first and second differential equations forward in time assuming substantially constant engine output torque during the integration period to thereby predict the engine speed that would occur were the engine driving a motor vehicle through the defined drivetrain elements in opposition to the road load; and generating a speed control signal for the dynamometer in accordance with the predicted engine speed to thereby load the engine as though it were actually installed in an motor vehicle with the modeled drivetrain elements.

2. The method set forth in claim 1, wherein the modeling of the shiftable ratio automatic transmission includes the steps of:

comparing engine and simulated vehicle operating parameters with a predetermined shift schedule and generating a shift indication when the desired gear is different than the current gear; and in response to the generation of a shift indication, successively effecting progressive adjustment of the speed and torque ratios provided by the transmission from the values defined by the current ratio to the values defined by the desired ratio.

3. The method set forth in claim 2, wherein the speed ratio of the transmission is used to couple the vehicle speed to the output speed of the torque converter, and the torque ratio of the transmission is used to couple the output torque of the torque converter to the input torque of the vehicle.

* * * * *